United States Patent
Don et al.

(10) Patent No.: US 11,200,321 B2
(45) Date of Patent: Dec. 14, 2021

(54) MAINTAINING TRUST ON A DATA STORAGE NETWORK

(71) Applicant: EMC IP Holding Company LLC, Hopkinton, MA (US)

(72) Inventors: Arieh Don, Newton, MA (US); Elie Antoun Jreij, Pflugerville, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 201 days.

(21) Appl. No.: 16/530,198

(22) Filed: Aug. 2, 2019

(65) Prior Publication Data

US 2021/0034747 A1    Feb. 4, 2021

(51) Int. Cl.
| | |
|---|---|
| *G06F 21/57* | (2013.01) |
| *H04L 9/00* | (2006.01) |
| *H04L 9/08* | (2006.01) |
| *G06F 21/60* | (2013.01) |

(52) U.S. Cl.
CPC .......... *G06F 21/57* (2013.01); *G06F 21/602* (2013.01); *H04L 9/006* (2013.01); *H04L 9/0819* (2013.01); *G06F 2221/034* (2013.01)

(58) Field of Classification Search
CPC .. G06F 21/57; G06F 21/602; G06F 2221/034; H04L 9/006; H04L 9/0819; H04L 9/0825; H04L 9/3271
See application file for complete search history.

(56) References Cited

U.S. PATENT DOCUMENTS

| | | | |
|---|---|---|---|
| 8,719,952 B1 | 5/2014 | Damm-Goossens | |
| 2004/0221049 A1* | 11/2004 | Blumenau | H04L 63/0442 709/229 |
| 2005/0113068 A1* | 5/2005 | Hoffmann | H04L 9/3263 455/411 |
| 2011/0231901 A1* | 9/2011 | Nakamura | G06F 13/385 726/3 |
| 2012/0030426 A1* | 2/2012 | Satran | G06F 21/6218 711/114 |
| 2013/0067236 A1* | 3/2013 | Russo | G06F 21/72 713/189 |
| 2015/0281233 A1 | 10/2015 | Asenjo et al. | |
| 2017/0026355 A1* | 1/2017 | Mathaiyan | H04L 9/3271 |
| 2019/0052617 A1* | 2/2019 | Chen | H04L 9/3265 |
| 2019/0394042 A1 | 12/2019 | Peddada | |

OTHER PUBLICATIONS

U.S. Appl. No. 16/530,172, filed Aug. 2, 2019, Don, et al.

* cited by examiner

*Primary Examiner* — Meng Li

(74) *Attorney, Agent, or Firm* — Muirhead and Saturnelli, LLC

(57) ABSTRACT

Trust may be maintained between a storage system and a host system by the host system validating its identity to the storage system. The storage system may instruct the host system to validate itself by setting a validation flag on the storage system. The host system may be configured to determine whether the validation flag is set. If the host system determines that the validation flag is set, the host system then may read a test string from the storage system. The host system may encrypt the test string using a private key, and send the encrypted test string to the storage system. The storage system may decrypt the encrypted string using a public key it previously received from the host system. The decrypted test string then may be compared against the original test string generated by the storage system.

17 Claims, 9 Drawing Sheets

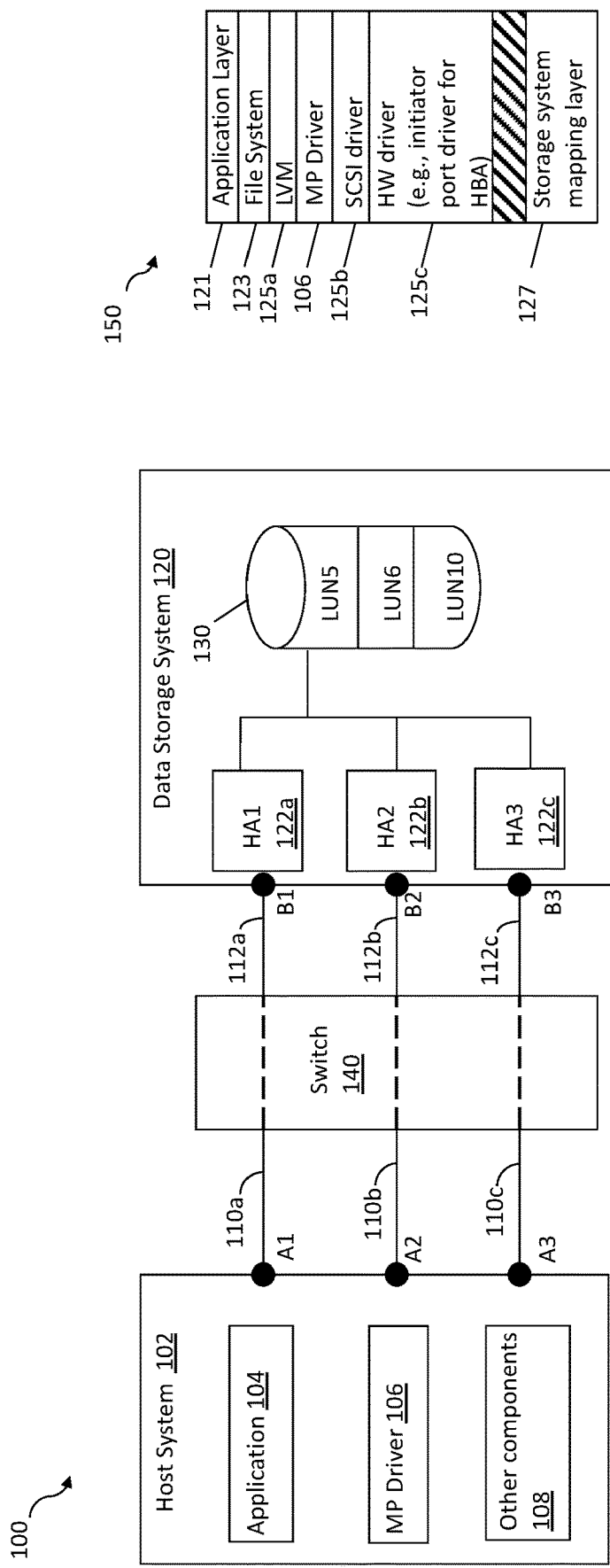

FIG. 8

| LSU | Host Port | Storage System Port | Other Info |
|---|---|---|---|
| Dev0 | WWN12 | WWN45 | |
| Dev1 | WWN9 | WWN117 | |
| ... | | | |
| Devn | WWN77 | WWN6 | |

802 — LSU
804 — Host Port
806 — Storage System Port
808 — Other Info
810a, 810b, 810c — 810
800

FIG. 9

| Initiator Port | Target Port | Other Info |
|---|---|---|
| WWWW1 | WWWW3 | |
| WWWW7 | WWWW8 | |
| ... | | |
| WWWW9 | WWWW2 | |

902 — Initiator Port
904 — Target Port
906 — Other Info
910a, 910b, 910c — 910
900

MAINTAINING TRUST ON A DATA STORAGE NETWORK

BACKGROUND

Technical Field

This application generally relates to data storage systems, and more particularly to trust on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

In some embodiments of the invention, a method of validating a host system to a storage system is performed. The method includes the host system reading a test string from the storage system, the host system encrypting the test string with a private key of the host system, the host system sending the encrypted test string to the storage system, and the storage system decrypting the test string using a public key of the host system.

The method may include, prior to the host system reading the test string, the storage system generating the test string, and determining whether the decrypted test string matches the generated test string.

The method may include, if the decrypted test string matches the generated test string, allowing the host system to access data on the storage system for at least a first logical storage unit associated with the host system.

The method may include, if the decrypted test string matches the generated test string, preventing the host system from accessing data on the storage system for at least a first logical storage unit associated with the host system.

The method may include setting a value for a parameter on the storage system to indicate to the host system to validate the host system to the storage system, setting a value for a test string on the storage system, and the host system determining the value of the parameter, where the host system reads the test string in response to determining the value.

The host system may poll periodically the storage system to determine the value of the parameter, and the validation may be performed for a specific one or more logical storage units associated with the host system and having data stored on the storage system.

In some embodiments, a data storage system includes one or more processors and a memory including code stored thereon that, when executed, performs the above-described method.

In some embodiments, one or more computer-readable media, for example, non-transitory computer-readable media, are provided having software stored thereon, the software including executable code that performs the above-described method.

BRIEF DESCRIPTION OF THE DRAWINGS

Features and advantages of the present invention will become more apparent from the following detailed description of illustrative embodiments thereof taken in conjunction with the accompanying drawings in which:

FIG. 5 is a block diagram illustrating an example of a system including a host system communicatively coupled to a data storage system via multiple I/O paths, according to embodiments of the invention;

FIG. 6 is a block diagram illustrating an example of a plurality of logical layers of a combination of a host system and a data storage system for processing an I/O request, according to embodiments of the invention;

FIG. 8 is a block diagram illustrating an example of a data structure defining port connectivity permissions between a storage system and one or more host systems, according to embodiments of the invention;

FIG. 9 is a block diagram illustrating an example of a data structure defining port connectivity permissions for a switch, according to embodiments of the invention;

DETAILED DESCRIPTION OF EMBODIMENTS

Figure 1:
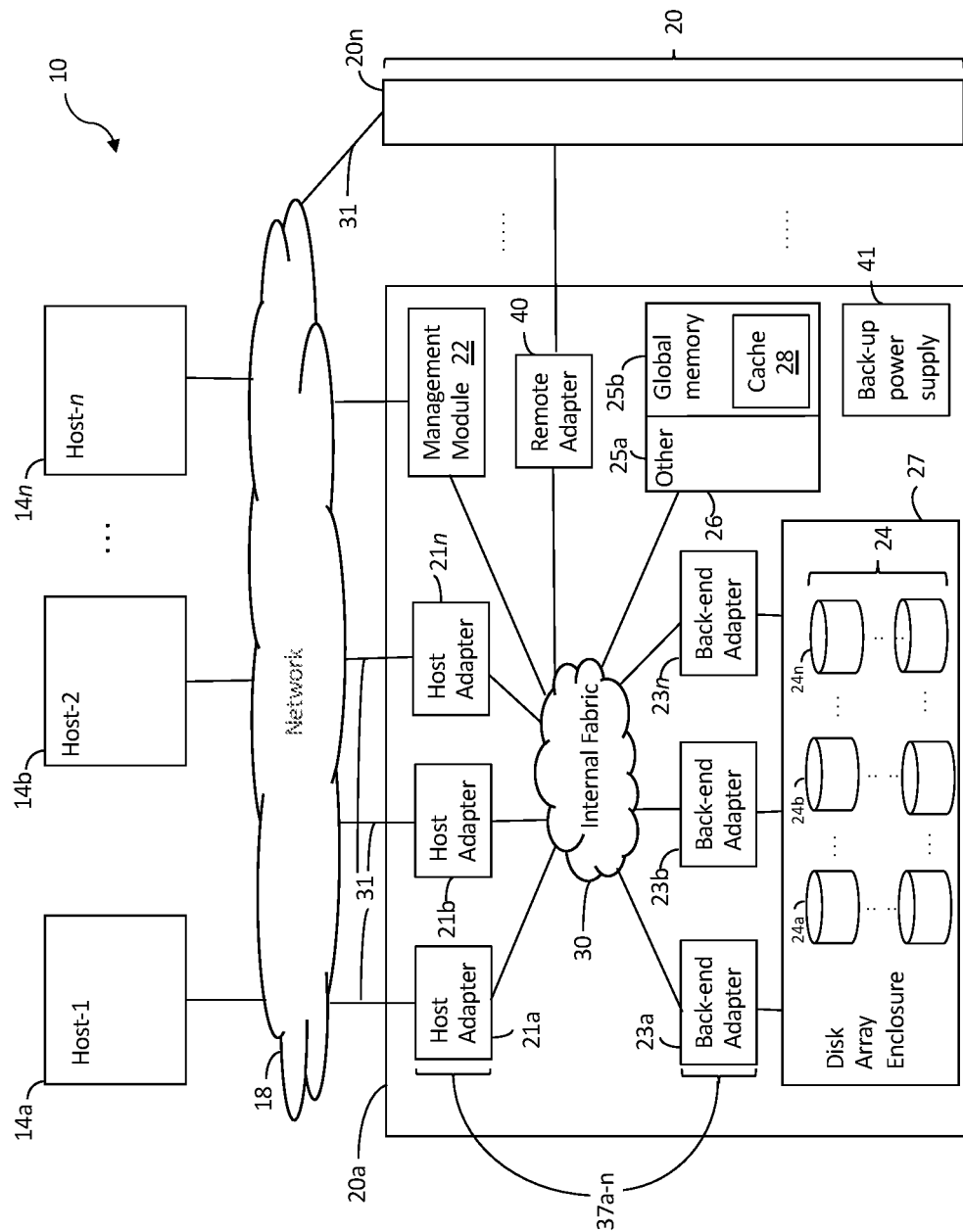
FIG. 1 is a block diagram illustrating an example of a data storage network, according to embodiments of the invention.

In today's storage networks, for example, in an enterprise environment, a storage system typically learns the identity of a host system and/or specific host ports of the host system during an initial provisioning of a server to the storage system. During this initial provisioning, depending on the connectivity protocol(s) employed, the storage system may learn the host name of the host system (e.g., when iSCSI is employed) and/or may learn an identity (e.g., the world wide name (WWN)) of one or more host ports of the host system (i.e., as initiators in accordance with one or more Fibre Channel (FC) protocols). Going forward, the storage system will associate communications (e.g., management and I/O) that indicate their source with a host name and/or host port IDs as being from the host system that was originally provisioned to the storage system using such host names and host port IDs.

Another host system (or another type of system or device) may spoof the storage system using the host name and/or port IDs of the original host system (i.e., the authentic host system). That is, the spoofing host system may use the host name and/or host port IDs of the authentic host system in communications with the storage system to fool the storage system into believing that the communications are coming from the authentic host system; i.e., to impersonate the authentic host system. For example, an attacker may obtain (e.g., remove) an actual physical host bus adapter (HBA), configured with host port IDs (e.g., WWNs), from the authentic host system, install the HBA in the spoofing host system, and communicate from the spoofing host system with the storage system using the obtained HBAs configured with the host port IDs. When the storage system receives the communications from the spoofing host system including the host port IDs previously provisioned to the storage system, the storage system will assume the communications are coming from the authentic host system. Even without an actual HBA or other hardware from the authentic host system, the attacker may configure (e.g., in hardware, firmware and/or software) the spoofing host system with the host name and/or host port IDs of the authentic host system, and use these configured host names and/or host port IDs in its communications with the storage system for spoofing.

What is desired is a way to prevent an identity of a host system and the identity of its host ports from being used by another host system, system or device to impersonate the host system in spoofing a storage system.

Described herein are mechanisms and techniques for preventing an impersonation of a host system (i.e., spoofing using an identify (e.g., name) of a host system or an identity of a host port) by establishing and maintaining trust between a storage system and the host system.

In some embodiments, a secure physical component referred to herein as a "trusted host facility" (THF) may be used to implement a root of trust on a host system. The THF may be configured in hardware, firmware and/or software so that it may not be accessed by an unauthorized entity, hacked or otherwise tampered with. The THF may be configured to employ cryptographic techniques to create key pairs, for example, to apply asymmetric cryptography (e.g., PKI) to generate a private key and a public key. These asymmetric keys may be used to establish and maintain trust between the host system and a storage system.

Various levels of security may be implemented using the THF. In some embodiments, a hardware-encrypted module (HEM) is included within the THF in which a hidden encryption key that is unique to the host system ("hidden key") is encoded in hardware such that it cannot be read (e.g., by software or an electrical or optical connection to the HEM). That is, the HEM may be configured to receive an input and produce an output that is the input encrypted using the hidden key, but the hidden key itself is not readable. In some embodiments, the hidden key may be the private key of an asymmetric key pair used to validate the host system.

In other embodiments, the hidden key is not the private key of an asymmetric key pair, but is a symmetric key (e.g., an AES key in accordance with AES encryption technology) that may be used to encrypt a private key used to validate a host system. For example, the THF may include a one-time programmable (OTP) cell in which logic and information may be written only once, and thereafter not be capable of being altered, but which still may be read (e.g., using software) internally by other logic within the THF. For example, the OTP may include an electronic circuit (e.g., an FPGA or other firmware) that can be programmed by applying electronic signals to the circuit to "hardcode" information and/or functionality into the circuit (e.g., during manufacturing of the host system) that cannot thereafter (or at least not after manufacturing) be reprogrammed. That is, the information or functionality may be "burned" or fused into the circuit.

In some embodiments, a private key unique to the host system may be programmed into the OTP, and this unique private key used to create a public key to share with other entities, e.g., storage systems. The THF may be configured such that the OTP private key cannot be read or otherwise discovered from outside the THF, but may be readable by software internal to the THF. The THF may be configured in hardware, firmware or software to generate a public key from the OTP private key, but to not allow the OTP private key to be read by entities external to the OTP. An OTP private key may not be as secure as a hidden key in an HEM, as it is at least possible for the OTP key to be read if the OTP is somehow hacked.

In another embodiment, a private key of an asymmetric pair used to validate a host system, whether an OTP private key or a private key otherwise obtained or generated, may be encrypted using a hidden key from an HEM, and this encrypted private key then may be stored in a non-volatile memory (e.g., a flash memory) within or external to the THF. When it is necessary to encrypt or decrypt data using the private key, the encrypted private key may be accessed from memory, and the hidden key used to decrypt the private key. In embodiments in which the private key is not an OTP key, after the private key is encrypted using the hidden key, the unencrypted private key may be erased so that only the encrypted private key remains stored, making the private key more secure.

In other embodiments in which an HEM and OTP are not available, a private key may be stored in memory of the THF that is configured to not be accessed from outside the THF, and also may be encrypted using another encryption key from another source, for an additional layer of security.

In some embodiments, a multi-path (MP) driver or other component of a host system may be configured to utilize the THF to establish and maintain trust between the host system and a storage system. For example, during provisioning of the host system to a storage system, the MP driver may request from the THF a public key corresponding to the unique private key of the host, and then send this public key to the storage system. The storage system may be configured to record the public key for the host system, for example, in a masking table that defines I/O connectivity for logical storage units (e.g., logical devices) between a host system and the storage system; i.e., defines, for a logical storage unit, the combinations of host ports and storage ports over which I/O communications may be exchanged. Masking tables are described in more details elsewhere herein.

In some embodiments, after initial provisioning of the host system to the storage system, trust may be maintained between the storage system and the host system by the host system (or host ports of the host system) validating its identity to the storage system, for example, periodically, at user initiation or in response to a change on the storage network. The storage system may instruct the host system to validate itself by setting a validation flag on the storage system. The host system (e.g., an MP driver of the host system) may be configured to determine whether the validation flag is set, for example, by periodically (e.g., once per second, minute, hour, etc.) polling the storage system for the value of the validation flag.

In some embodiments, the storage system may be configured to require validation of a host system for each individual logical storage unit on a storage system associated with the host system, i.e., on a per-logical-storage-unit basis. The data of some logical storage units may be considered to be more sensitive than data of other logical storage units. Accordingly, in some embodiments, different validation security levels (VSLs) may be associated with different logical storage units. The VSL associated with a logical storage unit may dictate a frequency with which a host system must poll the storage system to validate itself for the logical storage unit, as described in more detail elsewhere herein.

If the host system determines that a validation flag is set (e.g., for a specific logical storage unit), the host system then may read a test string from the storage system. For example, the storage system may be configured to generate a test string, for example, periodically, when setting the validation flag, or after each time the test string is read.

The host system may be configured to encrypt the test string using the private key. For example, an MP driver may send the test string to the THF as part of a request that the THF encrypt the test string, and the THF may return the encrypted test string to the MP driver. The host system (e.g., the MP driver) may send the encrypted test string to the storage system, and the storage system may decrypt the encrypted string using the public key it previously received from the host system. The decrypted test string then may be compared against the read test string generated by the storage system. If the comparison reveals a match, then the identity of the host system has been validated, and communications may continue between the storage system and the host system, for example, at least for a logical storage unit for which the validation was performed. The identity of the host is considered validated because only the holder of the private key of an asymmetric key pair (e.g., in accordance with PKI) can create a message digest (i.e., encrypted content resulting from the encryption) using the private key that can be decrypted properly using the public key of the key pair to produce the original test string in plaintext.

If the comparison does not reveal a match; i.e., if the decrypted test string is not the same as the generated test string, then this may be considered to mean that the host system is not the host system that provided the storage system the public key. The lack of a match could mean that host system currently communicating with the storage system is attempting to impersonate the authentic host system that generated the public key. In response to determining that the read test string and the decrypted test string do not match, the storage system may cease communications with the current host system, for example, at least for a logical storage unit for which the validation was performed, and notifications may be issued to one or more entities (e.g., security personnel and storage, network and/or host admins (of the authentic host system)). Other actions may be taken.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMf); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of circuit boards (i.e., "boards"), as described in more detail elsewhere herein.

In at least one embodiment, write data received at the storage system from a host or other client may be initially written to cache 28 and marked as write pending. For example, cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Figure 2:
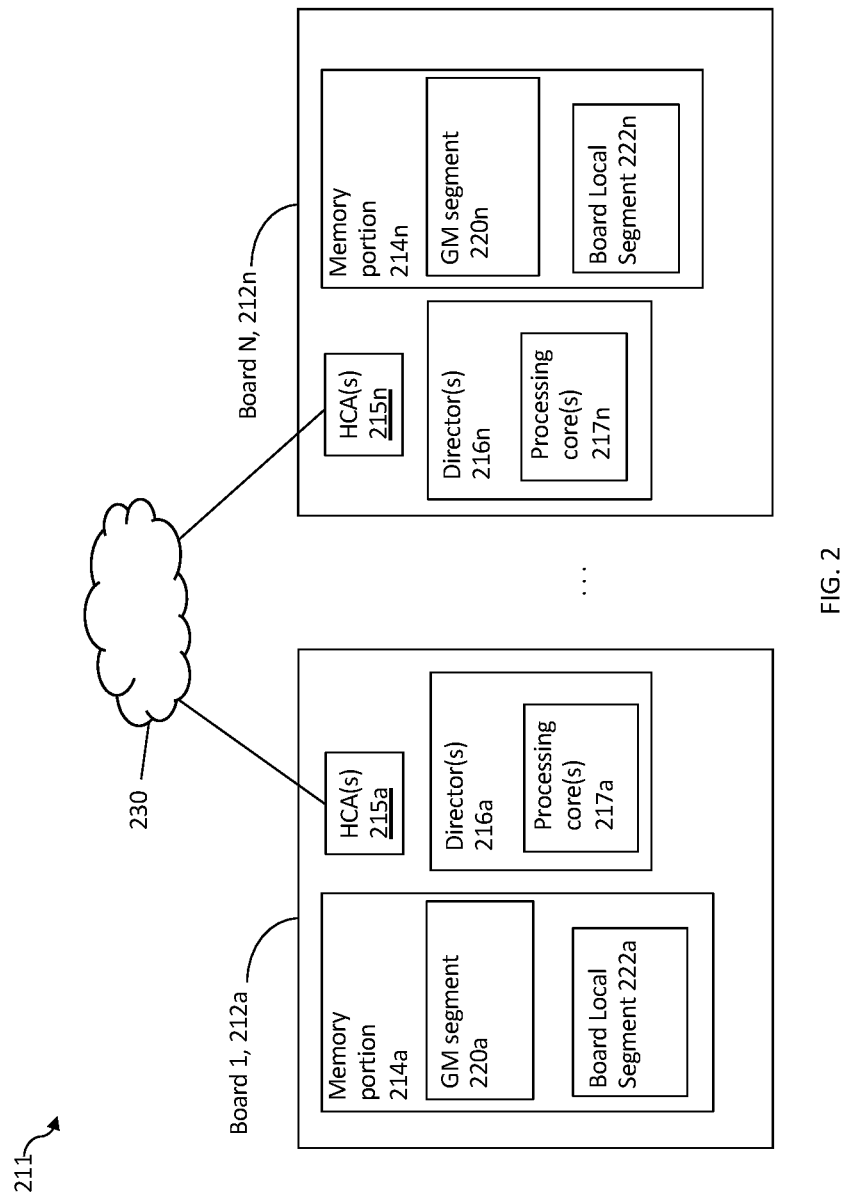
FIG. 2 is a block diagram illustrating an example of a storage system including multiple circuit boards, according to embodiments of the invention.

Any of storage systems 20a-n, or one or more components thereof, described in relation to FIGS. 1-2 may be implemented using one or more Symmetrix®, VMAX®, VMAX3® or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of logical storage units (LSUs) including, for example, a logical volume, logical block, LUN (i.e., logical device or logical disk), thin device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple boards 212a-212n. Storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, board 212a may include one or more directors 216a (e.g., directors 37a-n) and memory portion 214a. The one or more directors 216a may include one or more processing cores 217a including compute resources, for example, one or more CPUs cores and/or a CPU complex for processing I/O operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, board 212a includes memory portion 214a which is memory that is local to that particular board 212a. Data stored in memory portion 214a may be directly accessed by a CPU or core of a director 216a of board 212a. For example, memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of boards 212a-n may be further partitioned into different portions or segments for different uses. For example, each of the memory portions 214a-214n may respectively include GM segments 220a-n configured for collective use as segments of a distributed GM. Thus, data stored in any GM segment 220a-n may be accessed by any director 216a-n on any board 212a-n. Additionally, each of the memory portions 214a-n may respectively include board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, board local segment 222a may be a segment of the memory portion 214a on board 212a configured for board-local use solely by components on the single/same board 212a. For example, board local segment 222a may include data described in following paragraphs which is used and accessed only by directors 216a included on the same board 212a as the board local segment 222a. In at least one embodiment in accordance with techniques herein and as described elsewhere herein, each of the board local segments 222a-n may include a local page table or page directory used, respectively, by only director(s) 216a-n local to each of the boards 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or board local segments 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
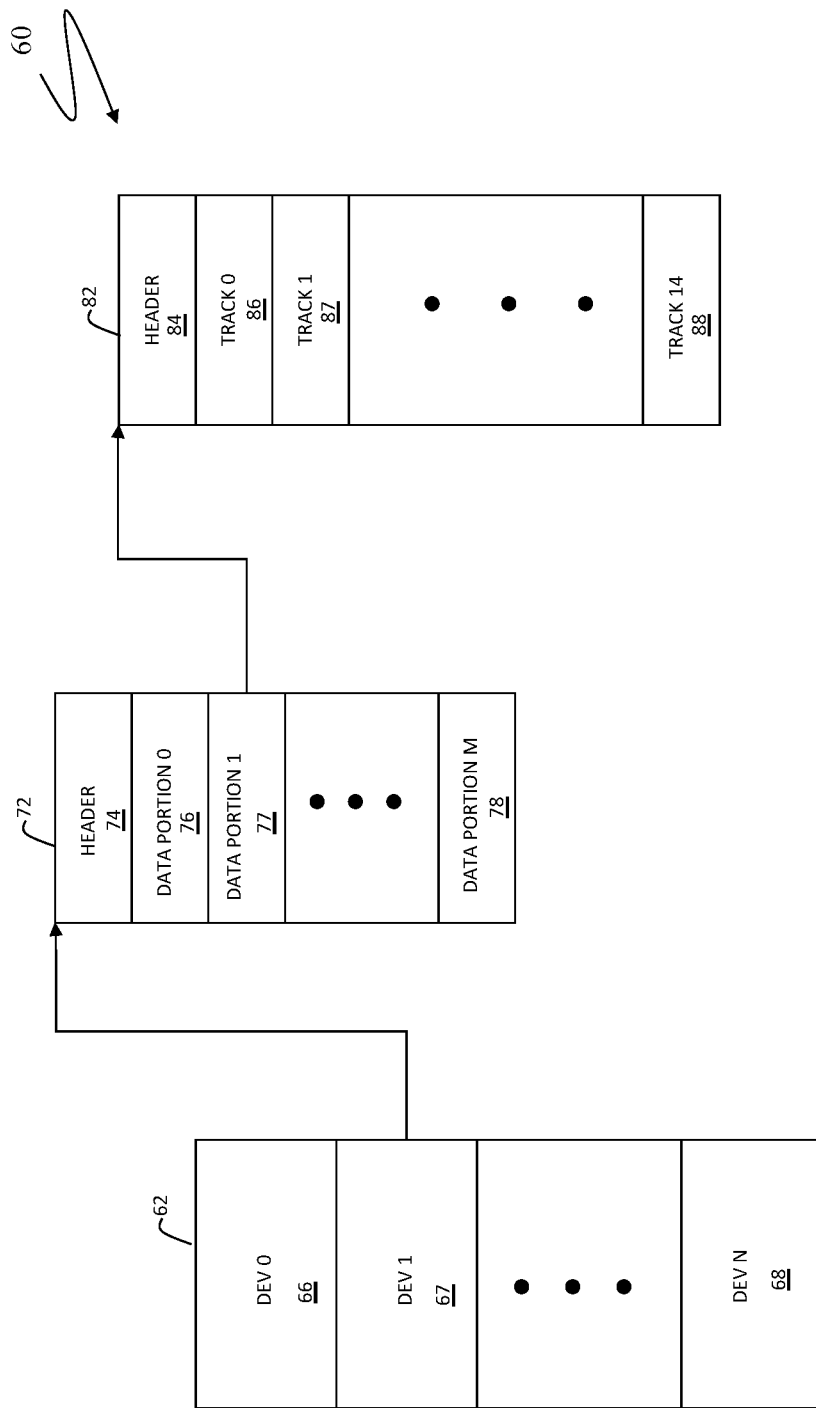
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 500, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein.

Figure 3B:
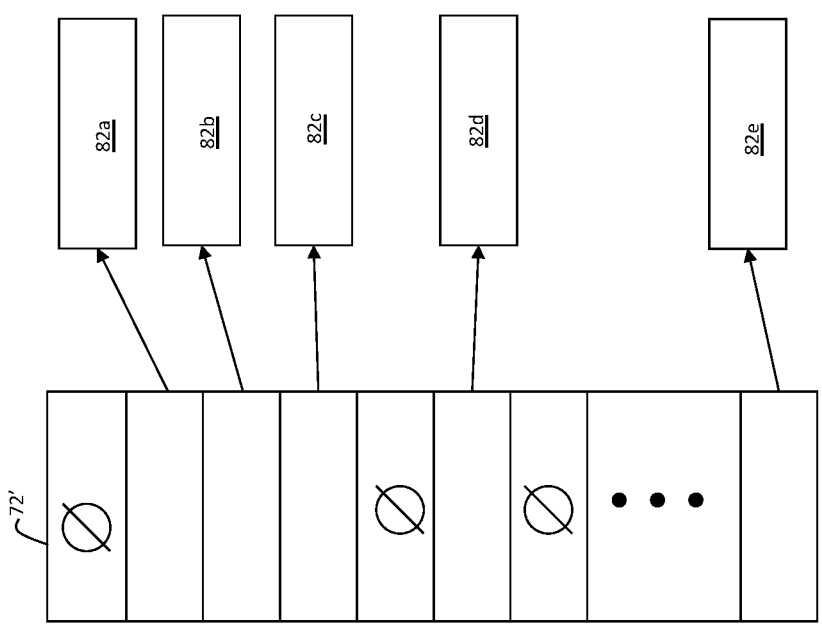
FIG. 3B a block diagram illustrating an example of a table used for a thin logical device, according to embodiments of the invention.

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82a-82e. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

Figure 4:
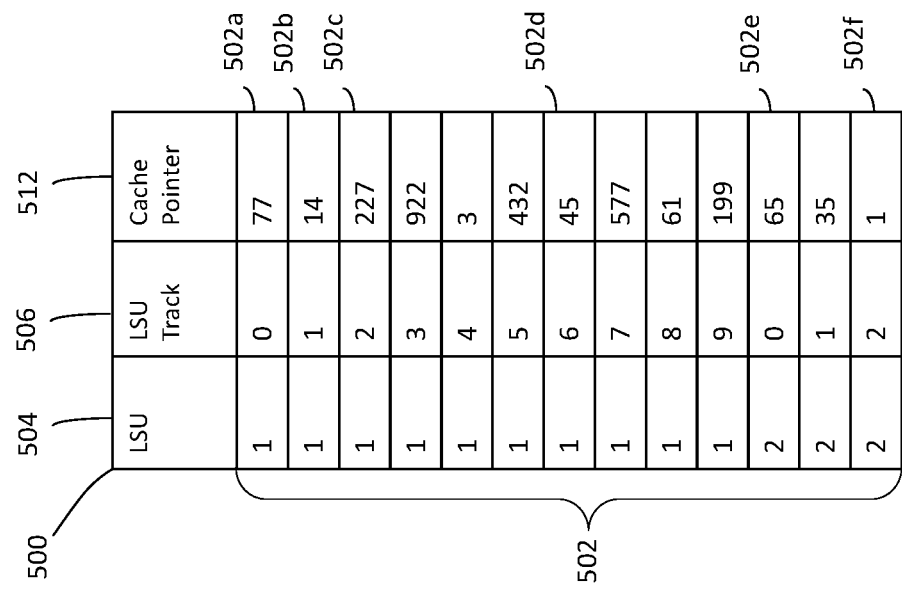
FIG. 4 is a block diagram illustrating an example of a data structure for mapping LSU tracks to cache slots, according to embodiments of the invention.

FIG. 4 is a block diagram illustrating an example of a data structure 500 for mapping LSU tracks (e.g., thin device tracks) to cache slots of a cache. Data structure 500 may be referred to herein as a "cache slot table." Cache slot table 500 may include a plurality of entries (i.e., rows) 502, each row representing an LSU track (e.g., any of LSU tracks 86-88 in track table 82) identified by an LSU ID in column 504 and an LSU track ID (e.g., number) identified in column 506. For each entry of cache slot table 500, column 512 may specify a cache location in a cache corresponding to the logical storage device track specified by columns 504 and 506. A combination of an LSU identifier and LSU track identifier may be used to determine from columns 504 and 506 whether the data of the identified LSU track currently resides in any cache slot identified in column 512. Through use of information from any of tables 62, 72, 72' and 82 described in more detail elsewhere herein, the one or more LSU tracks of an LSU specified in an I/O operation can be mapped to one or more cache slots. Further, using the same data structures, the one or more physical address ranges corresponding to the one or more LSU tracks of the LSU may be mapped to one or more cache slots.

The tables 62, 72, 72', 82 and 500 of FIGS. 3A, 3B, 4 and 5 may be stored in the GM 26 of the storage system 20a during operation thereof and may otherwise be stored in non-volatile memory (i.e., with the corresponding physical storage device). In addition, tables corresponding to LSUs accessed by a particular host may be stored in local memory of the corresponding one of the FAs 21a-n. In addition, RA 40 and/or the BEs 23a-n may also use and locally store portions of the tables 62, 72, 72', 82 and 500. Other data structures may be stored in any of GM 25b, memory 25a, GM segment 220a-n and/or board local segments 22a-n.

FIG. 5 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 20a-n and/or one or more hosts 14a-14n, or variation thereof.

The system 100 may include a host system 102, switch 140 and data storage system 120. The host system 102 and data storage system 120 may communicate over one or more I/O paths through the switch 140. Elements 110a-110c denote connections between the host system 102 and switch 140. Element 112a-112c denote connections between the data storage system 120 and the switch 140. Element 130 may represent a physical storage device of the data storage system 120, such as a rotating disk drive, flash-based or other solid state storage device, or the like, where the physical storage physical storage device 130 may be configured to include three LSUs—LUN5, LUN6 and LUN10. It should be noted that in the illustrative embodiment of FIG. 5, the system 100 includes only a single host system 102, single physical storage device 130 with 3 LSUs, a single data storage system 120, and a single switch for purposes of simplicity to illustrate the techniques herein. For example, each of the LSUs may be configured to have storage provisioned from multiple different physical storage devices rather than a single physical storage device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, or a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LSUs of physical storage device 130, configured to be accessible to the host system 102 over multiple I/O paths. As such, each of the I/O operations may be forwarded from the application 104 to the data storage system 120 over one of the possible multiple I/O paths.

The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical storage devices, such as physical storage device 130, where each such physical storage device may be configured to store data of one or more LSUs. Each of the LSUs having data stored on the physical storage device 130 may be configured to be accessible to the host system 102 through one or more I/O paths. For example, all LSUs of physical storage device 130 may be accessible using ports of the three FEs 122a-122c, also denoted respectively as host adapters HA1, HA2 and HA3. The multiple I/O paths allow the application I/Os to be routed over multiple I/O paths and, more generally, allow the LSUs of physical storage device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LSUs of the physical storage device 130 in order to determine which of the multiple I/O paths are active or available at a point in time, which of the multiple I/O paths are unavailable for communications, and to use such information to select an I/O path for host system-data storage system communications.

In the example of the system 100, each of the LSUs of the physical storage device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LSUs of the physical storage device 130 may be accessible over three I/O paths—a first I/O path represented by A1-B1, a second I/O path represented by A2-B2 and a third I/O path represented by A3-B3.

FIG. 6 is a block diagram illustrating an example of a plurality of logical layers 150 of a combination of a host system (e.g., the host system 102 of FIG. 3) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention. FIG. 6 provides further detail regarding various software layers that may be used in connection with the MP driver 106 of FIG. 5. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to an LSU which the host system may perceive as corresponding to a physical storage device address (e.g., the address of one of the disk drives) within the storage system. Below the LVM layer 125a may be the MP (multi-path) driver 106 which handles processing of the I/O received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 5. More generally, one or more layers between the application layer 121 and the MP driver 106, for example, the file system 123, may provide for mapping an LSU (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received I/O request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LSU known or exposed to the host system may not directly correspond to a physical storage device such as a disk drive. In such embodiments, the LSU specified by the host system in the I/O operation may be further mapped by the data storage system using its mapping layer 127. For example, an LSU specified by the host system may be mapped by the data storage system to one or more physical drives, and multiple LSUs may be located on a same physical storage device, multiple physical drives, and the like.

The MP driver 106, as well as other components illustrated in FIG. 6, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125a) or files (implemented using the file system 123), whereby such I/O requests may be mapped to I/O communications (specifying the I/O operation) directed to LSUs of the data storage system. Such I/O operations from the application layer 121 may be directed to the MP driver 106 after passing through any intervening layers such as, for example, the layers 123 and 125a. Communications between an initiator port of the host system and a target port of a data storage system (e.g., target port of an HA) may include those related to I/O operations and other non-I/O commands such as related to host system control operations. I/O operations may include, for example, read and write operations with respect to data stored on an LSU.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an HA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 5) and a second endpoint which is a port of an HA (e.g., such as B1-B3 of FIG. 5) in the data storage system. Through each such I/O path, one or more LSUs may be visible or exposed to the host system initiator through the target port of the data storage system.

Figure 7:
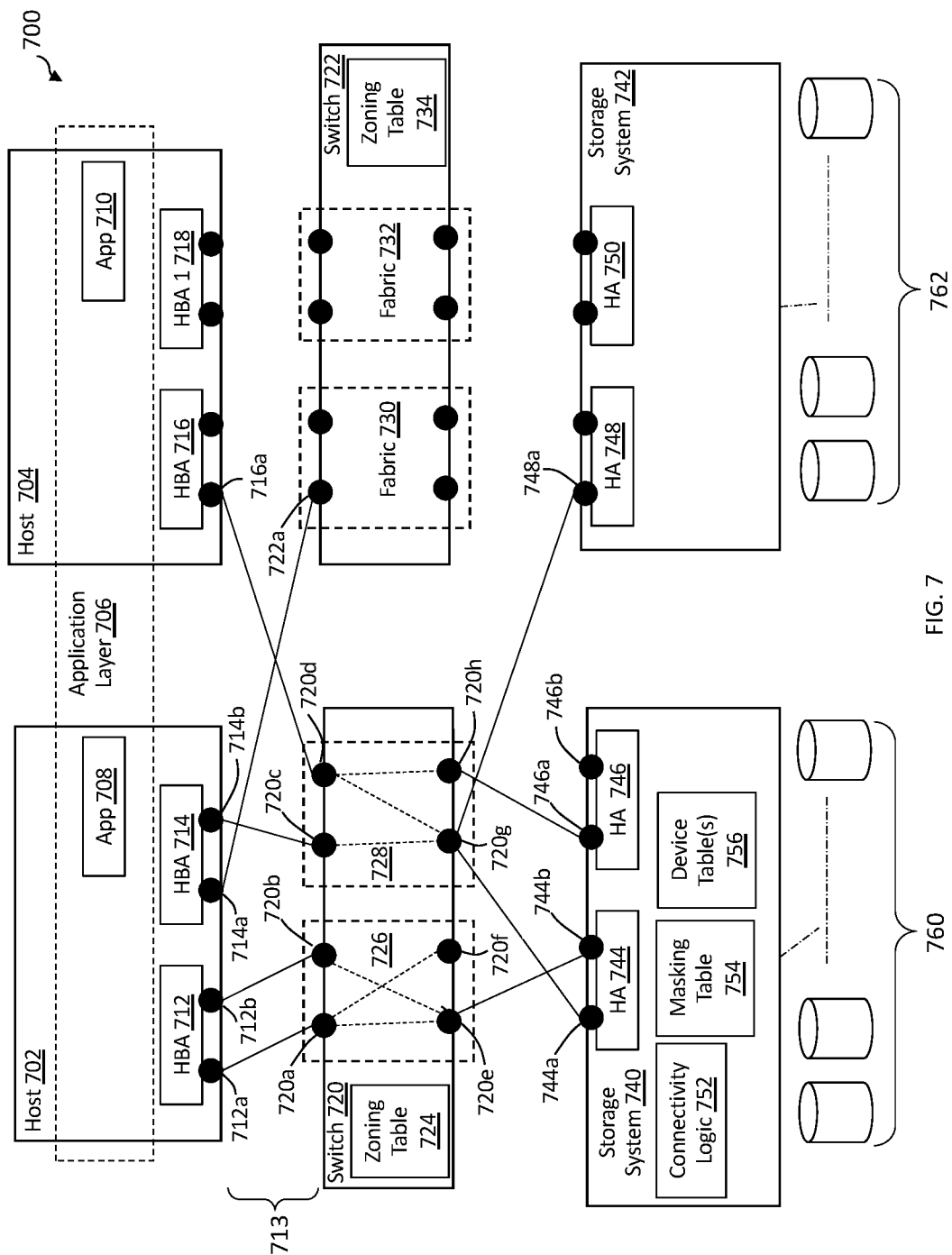
FIG. 7 is a block diagram illustrating an example of a storage network, according to embodiments of the invention.

FIG. 7 is a block diagram illustrating an example of a storage network 700, according to embodiments of the invention. Other embodiments of a storage network, for example, variations of storage network 700, are possible and are intended to fall within the scope of the invention. System 700 may include any of: hosts 702 and 704; switches 720 and 722; storage systems 740 and 742; physical storage devices 760 and 762; other components; or any suitable combination of the foregoing.

It should be appreciated that, while only two hosts are shown, system 700 may have significantly many more hosts, including tens, hundreds or even thousands more. Hosts 702 and 704 each may be physical host systems or virtual systems as part of a virtualized environment, and may be part of a host cluster and/or distributed across multiple physical devices and/or part of a cloud environment. Each of hosts 702 and 704 may be a host system 102 described in relation to FIG. 5 or include any of the components thereof described herein. Application layer 706 may represent the collective application layers of the software stacks of hosts 702 and 704, each of which may be an application layer 121 as described in relation to FIG. 6.

Host 702 may include any of: a portion of the application layer at 706; application 708; HBAs 712 and 714; and host ports 712a, 712b, 714a and 714b. The portion of application layer 706 running on host 702 may include application 708 and one or more other applications. HBA 712 may include host ports 712a and 712b, and HBA 714 may include host ports 714a and 714b. HBAs 712 and 714 each may be separate discrete logical or physical components of host 702, and host 702 may include more than the two HBAs illustrated. Each of the host ports 712a, 712b, 714a and 714b may be connected to a switch port of switch 720 or 722 (referred to herein as a switch host port (SHP) or fabric port) by physical connections 713. Each such physical connection may be a cable and, in some embodiments, there is only enabled one physical connection between each host port and fabric port (e.g., in accordance with a technology standard (e.g., FC)) as illustrated in FIG. 7. That is, in some embodiments, each fabric port is dedicated to one host port. FIG. 7 illustrates host ports 712a, 712b, 714a, 714b and 716a connected to fabric ports over physical connections 713 in which there is only one physical connection 713 between each host port and each fabric port.

Host 704 may include any of: a portion of the application layer at 706; application 710; HBAs 716 and 718; and multiple host ports including host port 716a of HBA 716.

Switch 720 may include any of: zoning table 724, fabrics 726 and 728; ports 720a-h; other components; or any suitable combination of the foregoing. Zoning table 724 may be a data structure that defines which host ports (as defined by a unique identifier such as a WWN), e.g., corresponding to host ports 712a, 712b, 714a, 714b and 7116a, are enabled to communicate with which storage system (e.g., HA) ports, for example, 744a, 744b, 746a, 746b and 748a, which may be referred to herein as storage system ports (SSPs). Zoning tables are described in more details elsewhere herein. The switch 720 may use the information in the zoning table 724 to determine the internal switch connections between fabric ports and SSPs to implement the defined zones, as illustrated by the dashed lines within switch 720 in FIG. 7. Zoning table 724 or another data structure on switch 720 may define one or more fabrics, including fabrics 726 and 728, for example, by specifying the switch ports that are members of the fabrics.

A fabric is a logical entity that includes one or more SHPs and one or more SSPs as its members, for which I/O connectivity associated with the fabric are only permitted between the member SHPs and SSPs, and not with any SHP or SSP that is not a member of the fabric. A fabric may include SHPs and/or SSPs from different switches, or may include only SHPs and/or SSPs of a single switch, for example, all of the SHPs and/or SSPs of a switch or a subset thereof. A fabric may be considered to define a virtual SAN (i.e., "VSAN"), and the term VSAN is sometimes used interchangeably with the term "fabric." Each fabric may have a unique identifier referred to herein as a "fabric name," which may be synonymous with a VSAN name. For example, a data structure on switch 720 or elsewhere may define that fabric 726 includes ports 720a, 720b, 720e and 720f.

Switch 722 may include any of: zoning table 734, fabrics 730 and 732; several ports including port 722a; other components; or any suitable combination of the foregoing. Each of switches 720 and 722 may be a switch 140 described in relation to FIG. 5 or include any of the components thereof described herein. In some embodiments, one or both of switches 720 and 722 may be a Dell EMC Connectrix™ switch or director made available by Dell EMC.

Storage system 740 may include any of: connectivity logic 752; masking table 754; device table(s) 756; HAs 744 and 746; storage ports 744a, 744b, 746a and 746b; other components; and any suitable combination of the foregoing. Device table(s) 756 may define properties of LSUs of the storage system 740, including logical devices (which may include thin devices) corresponding to physical storage devices 760, as described in more detail elsewhere herein. Masking table 754 may define which host ports (e.g., 712a, 712b, 714a, 714b, 716a) are permitted to communicate with which LSUs over which storage ports (e.g., 744a, 744b, 746a, 746b). Masking tables are described in more detail elsewhere herein.

Connectivity logic 752 may be configured with logic (software, hardware, firmware or a combination thereof) to perform one or processes in accordance with I/O connectivity on a storage network, for example, one or more of the methods described herein, or sub-steps thereof. Storage system 742 may include any of the same or similar components as storage system 740, including HA 748 and storage port 748a thereof. In some embodiments, storage systems 740 and/or 742 may be a storage system 20a and/or 120 described in relation to FIGS. 1 and 5, respectively, or include one more components and/or functionality thereof.

Storage systems (e.g., the storage systems 740 and/or 742) may maintain data structures (e.g., masking tables) that define I/O connectivity in terms of LSUs, storage ports and host ports; i.e., which ports of a host system ("host ports"; e.g., SCSI initiators) are permitted to perform I/O communications with which LSUs (e.g., identified with, and sometimes referred to as, a Logical Unit Numbers (LUNs)) over which ports of a storage system ("storage ports;" e.g., SCSI targets). Defining (including initially defining and later modifying) which host ports are permitted to perform I/O communications with which LSUs over which storage ports, for example, using a masking table or other data structure, may be referred to as configuring or defining I/O connectivity between a host port, storage port and LSU, or more simply as "masking."

FIG. 8 is a block diagram illustrating an example of a data structure 800 defining port connectivity permissions between a storage system and one or more host systems, according to embodiments of the invention. Other embodiments of a data structure defining port connectivity permissions between a storage system and one or more host systems, for example, variations of data structure 800, are possible and are intended to fall within the scope of the invention. In some embodiments, data structure 800 may be a masking table (e.g., masking table 754). Data structure 800 may include a plurality of entries 810, each entry representing an LSU (e.g., logical device) identified in column 802 and specifying a host port (e.g., by WWN) in column 804 with which the identified LSU is enabled to communicate I/O over the storage port identified in column 806. Other information, for example, the host and/or the HBA associated with the host port and/or the HA associated with the storage port may be specified in column 808. A data structure other than a table, for example, a linked list and/or object-oriented data structure, may be used to record the same information.

To properly configure I/O connectivity between host ports, storage ports and LSUs, it may be necessary to know the permissible I/O paths between host ports and storage ports (e.g., across a switch fabric), which may be defined by zoning tables on one or more switches of a switch fabric. Switches may include zoning tables that define the logical connections between SHPs and SSPs of the switch; e.g., by specifying pairs of host port IDs (e.g., WWNs) and storage ports IDs (WWNs), each identified host port corresponding to a directly connected (e.g., by an FC cable) SHP of the switch and each identified storage port corresponding to a directly connected SSP of the switch. Thus, the zoning table defines permissible I/O paths between a host system and a storage system, each I/O path defined by (and including) a host port and a storage port. Such I/O paths may be referred to herein as "zoned I/O paths" or "enabled I/O paths," and the process of defining (including initially defining and later modifying) enabled I/O paths in a zoning table, or the resulting enabled I/O paths collectively, may referred to herein as "zoning."

FIG. 9 is a block diagram illustrating an example of a data structure 900 defining port connectivity permissions for a switch, according to embodiments of the invention. Other embodiments of a data structure defining port connectivity permissions for a switch, for example, variations of data structure 900, are possible and are intended to fall within the scope of the invention. Data structure 900 may be a zoning table, and may include a plurality of entries 910, each entry representing an initiator port (e.g., a host port) in column 902 and a target port (e.g., a storage port) in column 904 with which the initiator port may communicate over a fabric. Other information, for example, host, HBA, HA, fabric name, etc. may be specified in column 906. A data structure other than a table, for example, a linked list and/or object-oriented data structure, may be used to record the same information.

After a switch has been zoned during an initial configuration of a network, and perhaps later if a switch is rezoned, host ports may log into storage ports. A host port logging into a storage port may include the host port and storage port exchanging unique identifiers (e.g., WWNs) and other information, for example, in accordance with an FC protocol. The log-in process also may include the host port inquiring to the storage port about any LSUs available through the storage port, for example, by issuing a REPORT LUNS command in accordance with a SCSI protocol. The storage port may respond with a list of LSUs available to the host port through the storage port, for example, by providing a list of LSU identifiers (e.g., LUNs), after which host registration may be performed. Host registration may include the host port providing host information to the storage port, including, for example: a host operating system (OS), OS level, host vendor and model, vendor unique (VU) commands used by the host, virtual machines (VMs) running on the host, and/or other host information.

During the login of a host port to a storage port, a log-in table may be updated. Each entry of the log-in table may represent and specify a host port and a storage port into which the host port logged. For ease of reference, this host port-storage port combination of each entry may be referred to herein as an I-T (initiator-target) pair, even though the invention is not limited to SCSI technology. Each log-in table entry may specify an I-T pair and other information pertaining to the I-T pair.

Figure 10:
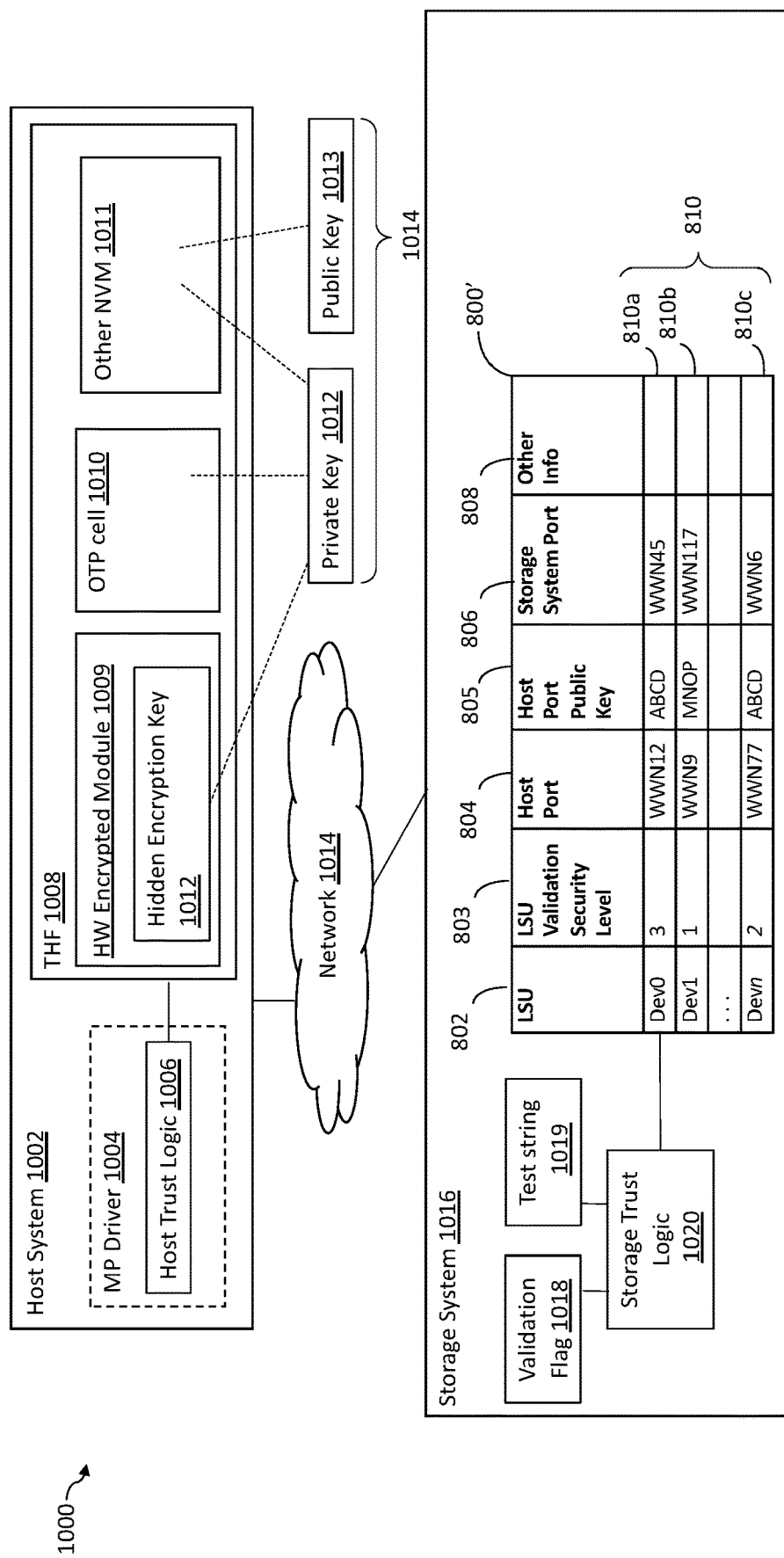
FIG. 10 is a block diagram illustrating an example of a system for establishing and maintaining trust between a host system and a storage system, according to embodiments of the invention.

FIG. 10 is a block diagram illustrating an example of a system 1000 for establishing and maintaining trust between a host system and a storage system, according to embodiments of the invention. Other embodiments of a system for establishing and maintaining trust between a host system and a storage system, for example, variations of system 1000, are possible and are intended to fall within the scope of the invention.

The system 1000 may include any of: a host system 1002; a network 1014 and a storage system 1016. The host system 1002 may include any of the components of host systems described in relation to hosts 14a-n, 102, 702 and 704. The host system 1002 may include any of host trust logic 1006, which may be part of an MP driver 1004, which may be implemented with any of the functionality and components described herein in relation to as the MP driver 106. The host trust logic 1006 may be configured to perform one or more actions described herein as being performed by a host system to establish and/or maintain trust, for example, in relation to methods 1100 and 1200.

The host system 1002 also may include a THF 1008, which may be configured to implement any of the capabilities described herein in relation to THFs. For example, the THF 1008 may include one or more components for providing security, including, for example, a hardware-encrypted module (HEM) 1009, an OTP cell 1010, and other non-volatile memory (NVM) 1011, each of which may have one or more features described for components of these types elsewhere herein. The HEM 1009 may contain a hidden encryption key 1012, which may be unique to the host system 1002 and unreadable. The hidden encryption key 1012 may be used as a private key for validating the host system 1002 and/or may be used to encrypt such a private key, as described in more detail elsewhere herein. The OTP cell may be used to generate and contain an OTP private key that may be used to validate the server, as described in more detail elsewhere herein.

The THF 1008 may be used to generate and store an asymmetric pair of keys 1014, including the public key 1012 and the public key 1013. The private key 1012 may be stored in the HEM 1009 as the hidden encryption key 1012, in the OTP cell 1010, in the other NVM 1011 or elsewhere on host system 1002 including outside of the THF 1008. The public key 1013 may be stored in the other NVM 1011 or elsewhere on the host system, including outside of the THF 1008.

The host trust logic 1006 may interact with the THF 1008 to at least assist in establishing and maintaining a storage system's trust in a host system, as describe in more detail elsewhere herein. The THF 1008 may be implemented as, include, or be included within, an iDRAC component made available by Dell EMC.

The network 1014 may include any of the components, and/or be configured to implement any of the functions, described in relation to the network 18, the switch 140 and/or switches 720 and 722.

The storage system 1016 may include any of the components, and/or be configured to implement any of the functions, described in relation to the storage systems 20a, 120, 740 and 742. The storage system 1016 may include any of: storage trust logic 1020, a validation flag 1018, a test string 1019 and a masking table 800'. The storage trust logic 1020 may be configured to perform functions described herein as being performed by a storage system to establish and/or maintain trust, for example, in relation to methods 1100 and 1200. The storage trust logic 1020 may be implemented, at least in part, as part of a management module (e.g., the management module 22) and/or one or more directors (e.g., any of directors 37a-n).

The masking table 800' may be a variation of the masking table 800 described elsewhere herein, with the addition that each of entries 810 may include additional fields in columns 803 and 805. The value in the field for the LSU validation security level (VSL) column may specify a VSL for the LSU represented by the entry, which may be used (among other purposes) to determine a frequency with which to poll the storage system 1016 to validate a host system for the LSU represented by the entry.

The data in the field for column 805 may specify a host port public key associated with the host port identified in the column 804 of the entry. The host port public key field may be populated (e.g., by the storage trust logic 1020), for example, during provisioning of the host system 1002 to the storage system 1016, with the public key generated for the host system. The public key specified in column 805 may later be used to decrypt an encrypted test string received from the host system 1002 during validation of the host system. It should be appreciated that the masking table 800' may include entries for LSUs associated with a same or different host systems. For example, each of entries 810a and 810c have a same public key (="ABCD") specified in the column 805, which means that each of host ports WWN12 and WWN77 are part of a same host system (e.g., the host system 1002), whereas the entry 810b has a different public key (="MNOP") meaning that the port WWN9 is from a different host system (e.g., not host system 1002) than ports WWN12 and WWN77.

The validation flag 1018 may specify a value indicating whether or not validation should be performed on the host system 1016, as described in more detail elsewhere herein. While only a single validation flag is shown, it should be appreciated that a separate flag may be used for each host system storing data on the storage system 1016. For example, the storage system 1016 may include a validation table (not shown), where each entry specifies a host system ID and holds a value for a validation flag of the host system identified. The storage trust logic 1020 may be configured to set or clear the validation flag(s).

Further, a separate validation flag and/or test string may be provided for each LSU associated with any host systems (e.g., the host system 1002) having data corresponding to the storage system (i.e., data stored on the storage system or to be stored on the storage system). These test strings and validation flags may be stored in the masking table 800', for example, in the other information column 808, or may be stored in another data structure, e.g., a validation table as described above.

The storage trust logic 1020 may be configured to set one or more validation flags periodically, in response to user input and/or in response to a change on a storage network. For example, one or more components of the storage system 1016 or the network 1014 (e.g., a switch) may detect that a host system or a host port has been added or removed, or a physical connection between a host port or storage port and a switch port has been connected or disconnected, or a zoning table change has been made, etc. In response to the detected change, one or more registered state change notifications (RSCNs), perhaps as part of an RSCN storm, may be issued. The storage trust logic 1020 may be configured to detect an RSCN, or an RSCN storm, and to set one or more validation flags for one or more respective host accordingly.

A value of the test string 1019 may be defined and changed by the storage trust logic 1020 for the purposes of validation, to be read and encrypted by the host system 1016, and compared to a decrypted test string, as described in more detail elsewhere herein.

Figure 11:
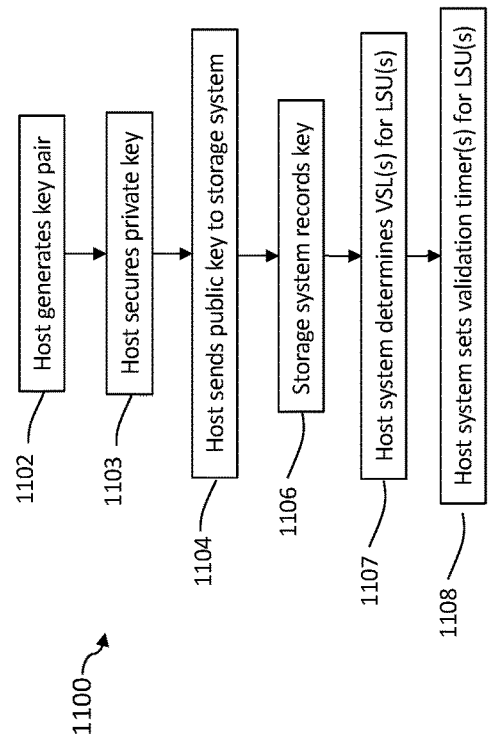
FIG. 11 is a flow chart illustrating an example of a method of establishing trust between a host system and a storage system, according to embodiments of the invention.

FIG. 11 is a flow chart illustrating an example of a method 1100 of establishing trust between a host system and a storage system, according to embodiments of the invention. Other embodiments of a method of establishing trust between a host system and a storage system, for example, variations of method 1100, are possible and are intended to fall within the scope of the invention.

In a step 1102, a host system may generate a key pair, for example, an asymmetric key pair including a private key and a public key. For example, during provisioning of the host system (e.g., the host system 1002) to a storage system (e.g., the storage system 1016), which may involve host registration and log-in as described in more detail elsewhere herein, a component of the host system (e.g., the host trust logic 1006 of the MP driver 1004) may request from a THF (e.g., the THF 1008) a public key corresponding to a unique private key of the host). As described in more detail elsewhere herein, the THF key may be a private key unique to the host, and may be inaccessible (e.g., unreadable) to components external to the THF and may be unreadable.

In some embodiments, the private key may be secured further in a step 1103, for example, by encrypting the private key with a hidden key unique to the host system and unreadable, for example, the hidden encryption key 1012.

In a step 1104, the host system may send the public key to the storage system, for example, as part of the provisioning process. In a step 1006, the public key may be recorded on the storage system, for example, in the masking table 800' of the storage system 106, e.g., by the storage trust logic 1020.

In a step 1107, for one or more LSUs on the storage system associated with the host system, the VSL for the LSU may be determined. The VSL of an LSU may dictate a frequency (e.g., 1/second, 1/minute, 1/hour) with which the host system polls the storage system to validate the host system for the LSU. Accordingly, for each LSU of the storage system associated with the host system, a validation timer based on the VSL may be set in a step 1108.

In some embodiments, one or more provisioning algorithms on the host system 1002 and/or the storage system 1016 may be modified to implement the method 1100.

In some embodiments, after initial provisioning of the host system to the storage system, trust may be maintained between the storage system and the host system by the host system (or host ports of the host system) validating its identity to the storage system, for example, periodically, at user initiation or in response to a change on the storage network, embodiments of which will now be described. In some embodiments, such validation may be performed on a per-LSU basis, at a frequency corresponding to a VSL of the LSU.

Figure 12:
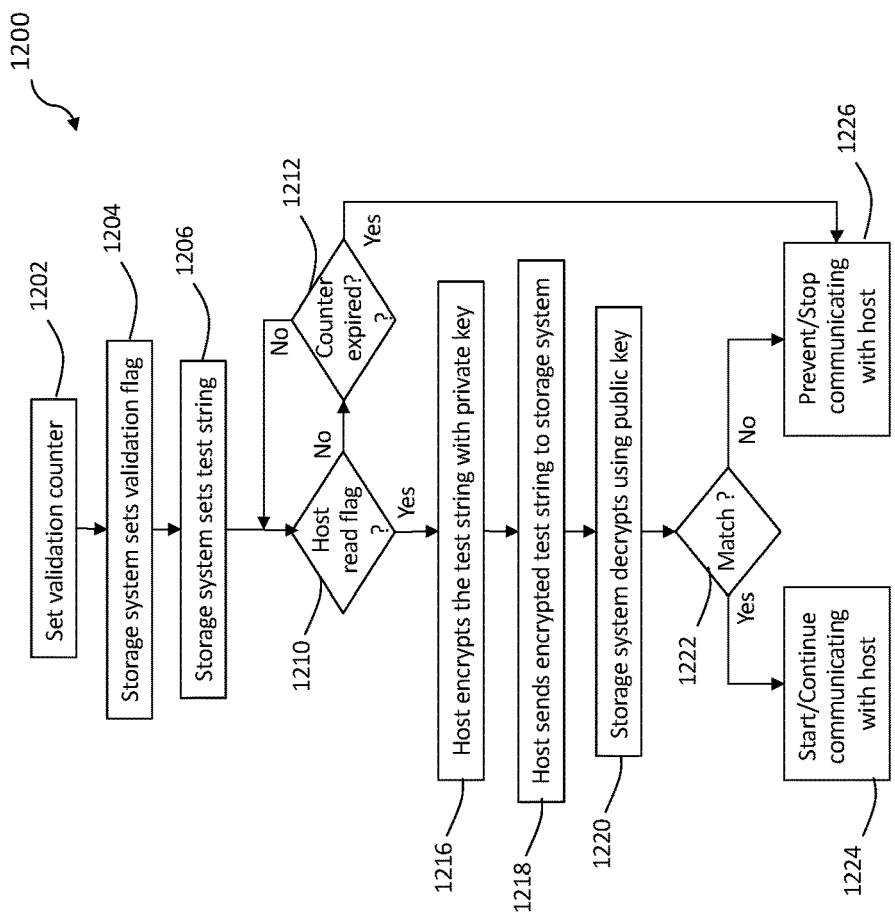
FIG. 12 is a flow chart illustrating an example of a method of validating a host system to a storage system, according to embodiments of the invention.

FIG. 12 is a flow chart illustrating an example of a method 1200 of validating a host system to a storage system, according to embodiments of the invention. Other embodiments of a method of validating a host system to a storage system, for example, variations of method 1200, are possible and are intended to fall within the scope of the invention. In some embodiments, each iteration of the method 1200 may be performed once for each host system communicating with a storage system, for example, irrespective of any LSUs, in which case a single validation counter, validation flag and test string parameter may be used for the host system. In other embodiments, the method 1200 may be performed separately for each LSU on a storage system corresponding to a host system, where a different validation counter, validation flag and/or test string parameter may be used for each LSU, and the validation counter may be based on an VSL of the LSU. The method 1200 will now be described for a host system, not specific to LSUs, but the method 1200 is not so limited.

In a step 1202, a validation counter for a host system may be set. In a step 1204, the storage system (e.g., the storage trust logic 1020) may set a validation flag (e.g., the validation flag 1018) to instruct the host system to validate itself.

In a step 1206, the storage system (e.g., the storage trust logic 1020) may generate a test string (e.g., the test string 1019).

In a step 1210, it may be determined whether the host system has read the validation flag. For example, the host system may be configured to periodically poll the validation flag, and the storage system may be configured to detect when it does.

It may be desirable to have the storage system control when validation is performed (e.g., by setting the validation flag), as opposed to the host system, because it is in the storage system's interest (or the interest of the owner or user of the storage system) to ensure that it is not being spoofed, and if indeed there is an attacker, the attacker likely would not want validation to ever be performed. Further, in some embodiments, a technology being used may not permit the storage system to initiate a validation. For example, iSCSI technologies may require that communications be initiated by an initiator (e.g., a host port) in which case it may be necessary for a host system initiate validation, for example, by reading the test string in the step 1204.

If it is determined in the step 1210 that the host has not read the flag, then it may be determined in a step 1212 whether the validation counter set in the step 1202 has expired. If the counter has expired, then the method 1200 may proceed to the step 1226 in which communication between the host system is stopped or prevented. The storage system may take further actions as well, including notifying one or more interested parties, sending a reminder communication to the host system and/or ceasing/disabling communications to/from the host system until the issue is resolved.

If it is determined in the step 1212 that the validation counter has not expired, then the method 1200 may return to monitoring whether the host flag has been read.

In response to determining that the host has read the validation flag has been read, this means that the host system has (or will shortly) read the test string from the storage system. For example, in embodiments in which an iSCSI protocol is employed, the storage system and host system may be configured to use a vendor unique (VU) field, e.g., of a command descriptor block (CDB) or other field to implement one or more of steps 1204, 1206 and read the test string.

It also may be determined (not shown) when the host system has read the test string. After each time the test string is read by the host system, the storage system may generate a new test string. The storage system (e.g., the storage trust logic 1020) may be configured to generate a new test string periodically, or when it sets the validation flag, or after each time a test string is read by the host system. It may be desirable to generate new test strings to ensure that an attacker cannot intercept a previously encrypted test string (e.g., in connection with a step 1218 described below), and then re-send the encrypted string from another host system to impersonate the authentic host system and fool the storage system that the spoofing host system is the authentic host system.

In a step 1216, the host may encrypt the test string, for example, using the private key from which the public key was generated. For example, the host trust logic 1006 may send the test string to the THF 1008 as part of a request that the THF 1008 encrypt the test string. The THF 1008 may encrypt the test string using the private key unique to the host system, and return the encrypted test string to the host trust logic 1006.

In a step 1218, the host system (e.g., the host trust logic 1006) may send the encrypted test string to the storage system, and the storage system (e.g., the storage trust logic 1020) may compare the decrypted test string to the test string that was generated by the storage system and read from the storage system by the host system to determine whether there is a match in a step 1222.

If the comparison reveals a match, then the identity of the host system has been validated, and, in a step 1224, communications may continue (or start if there has not been any communications yet) between the storage system and the host system.

If the comparison does not reveal a match; i.e., if the decrypted test string is not the same as the read test string, then this may be considered to mean that the host system is not the host system that provided the storage system the public key. This could mean that host system currently communicating with the storage system is attempting to impersonate the authentic host system that generated the public key. In response to determining that the read test string and the decrypted test do not match, in a step 1226, the storage system may cease (or never start)/prevent communications to/from the current host system, and notifications may be issued to one or more interested entities (e.g., security personnel and storage, network and/or host admins (of the authentic host system)). Other actions may be taken.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 1100 and 1200, or parts thereof, may be implemented using one or more of the systems and/or data structures described in relation to FIGS. 1-10, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of validating a host system to a storage system for a first logical storage unit on the storage system corresponding to the host system, comprising:
   defining a verification security level for the first logical storage unit;
   providing a data structure including a plurality of entries, each entry representing a logical storage unit of the storage system and specifying a host port with which the represented logical storage unit is enabled to communicate I/O over a storage port of the storage system;
   storing the verification security level of the first logical storage unit in an entry of the data structure representing the first logical storage unit; and
   validating the host system to the storage system for the first logical storage unit multiple times, wherein a frequency of the performance of the validation is based on the verification security level of the first logical storage unit, and wherein the validating includes:
   the host system reading a test string from the storage system;
   the host system encrypting the test string with a private key of the host system;
   the host system sending the encrypted test string to the storage system; and
   the storage system decrypting the test string using a public key of the host system.

2. The method of claim 1, wherein the validating further includes:
   prior to the host system reading the test string, the storage system generating the test string; and
   determining whether the decrypted test string matches the generated test string.

3. The method of claim 2, wherein the validating further includes:
   when the decrypted test string matches the generated test string, allowing the host system to access data of the first logical storage unit on the storage system.

4. The method of claim 2, wherein the validating further includes:
   when the decrypted test string does not match the generated test string, preventing the host system from accessing data of the first logical storage unit on the storage system.

5. The method of claim 1, further comprising:
   setting a value for a parameter on the storage system to indicate to the host system to validate the host system to the storage system for the first logical storage unit; and
   setting a value for a test string on the storage system, wherein the validating further includes:
   the host system determining the value of the parameter, and
   the host system reading the test string in response to determining the value.

6. The method of claim 5, wherein the host system periodically polls the storage system, at a frequency based on the verification security level of the first logical storage unit, to determine the value of the parameter.

7. A system comprising:
one or more processors;
a data structure including a plurality of entries, each entry representing a logical storage unit of the storage system and specifying a host port with which the represented logical storage unit is enabled to communicate I/O over a storage port of the storage system; and
memory comprising code stored thereon that, when executed, performs a method of validating a host system to a storage system for a first logical storage unit on the storage system corresponding to the host system, including:
defining a verification security level for the first logical storage unit;
storing the verification security level of the first logical storage unit in an entry of the data structure representing the first logical storage unit; and
validating the host system to the storage system for the first logical storage unit multiple times, wherein a frequency of the performance of the validation is based on the verification security level of the first logical storage unit, and wherein the validating includes:
the host system reading a test string from the storage system;
the host system encrypting the test string with a private key of the host system;
the host system sending the encrypted test string to the storage system; and
the storage system decrypting the test string using a public key of the host system.

8. The system of claim 7, wherein the validating further includes:
prior to the host system reading the test string, the storage system generating the test string; and
determining whether the decrypted test string matches the generated test string.

9. The system of claim 8, wherein the validating further includes:
when the decrypted test string does not match the generated test string, allowing the host system to access data of the first logical storage unit on the storage system.

10. The system of claim 8, wherein the validating further includes:
when the decrypted test string matches the generated test string, preventing the host system from accessing data of the first logical storage unit on the storage system.

11. The system of claim 7, wherein the method further comprises:
setting a value for a parameter on the storage system to indicate to the host system to validate the host system to the storage system for the first logical storage unit; and
setting a value for a test string on the storage system, wherein the validating further includes:
the host system determining the value of the parameter, and
host system reading the test string in response to determining the value.

12. The system of claim 11, wherein the host system periodically polls the storage system, at a frequency based on the verification security level of the first logical storage unit, to determine the value of the parameter.

13. One or more computer-readable non-transitory media having software stored thereon, the execution of which results in validating a host system to a storage system for a first logical storage unit on the storage system corresponding to the host system, the software comprising:
executable code that defines a verification security level for the first logical storage unit
executable code that accesses a data structure including a plurality of entries, each entry representing a logical storage unit of the storage system and specifying a host port with which the represented logical storage unit is enabled to communicate I/O over a storage port of the storage system; and
executable code that stores the verification security level of the first logical storage unit in an entry of the data structure representing the first logical storage unit; and
executable code that validates the host system to the storage system for the first logical storage unit multiple times, wherein a frequency of the performance of the validation is based on the verification security level of the first logical storage unit, including:
executable code that controls the host system to read a test string from the storage system;
executable code that controls the host system to encrypt the test string with a private key of the host system;
executable code that controls the host system to send the encrypted test string to the storage system; and
executable code that controls the storage system to decrypt the test string using a public key of the host.

14. The one or more computer-readable non-transitory media of claim 13, the executable code that validates the host system to the storage system for the first logical storage unit further comprising:
executable code that, prior to the host system reading the test string, controls the storage system generating the test string; and
executable code that determines whether the decrypted test string matches the generated test string.

15. The one or more computer-readable non-transitory media of claim 14, the executable code that validates the host system to the storage system for the first logical storage unit further comprising:
executable code that, when the decrypted test string matches the generated test string, allows the host system to access data of the first logical storage unit on the storage system.

16. The one or more computer-readable non-transitory media of claim 14, the executable code that validates the host system to the storage system for the first logical storage unit further comprising:
executable code that, when the decrypted test string does not match the generated test string, prevents the host system from accessing data of the first logical storage unit on the storage system.

17. The one or more computer-readable non-transitory media of claim 13, the software further comprising:
executable code that sets a value for a parameter on the storage system to indicate to the host system to validate the host system to the storage system for the first logical storage unit; and
executable code that sets a value for a test string on the storage system,
wherein the executable code that validates the host system to the storage system for the first logical storage unit further includes:
executable code that controls the host system determining the value of the parameter, executable code that controls the host system reading the test string in response to determining the value.

* * * * *